Nov. 20, 1962   E. E. DONATH   3,064,640
EXTERNAL HEATING DEVICE
Filed Jan. 13, 1961
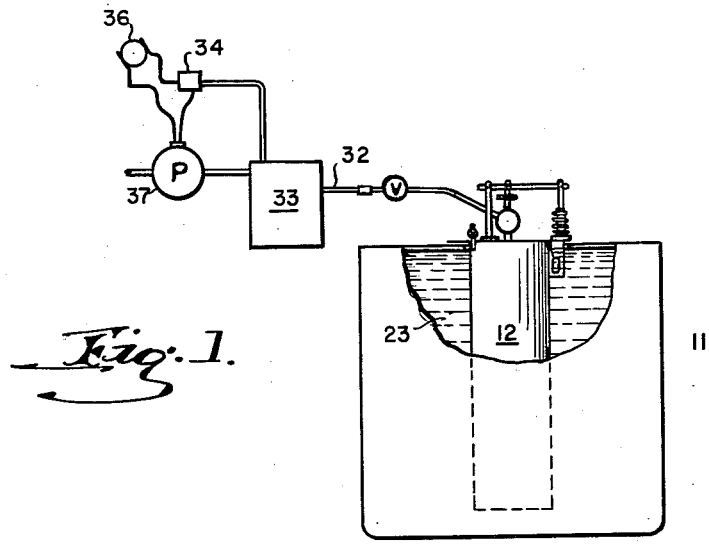
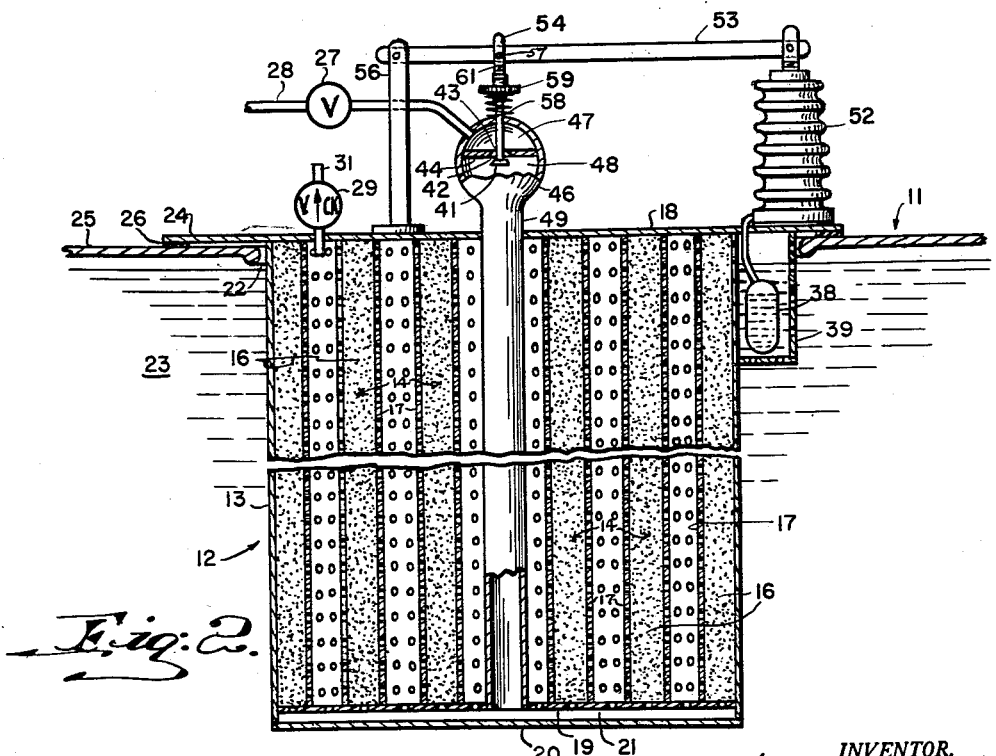
INVENTOR.
ERNEST E. DONATH.
BY Leo I. MaLossi,
his ATTORNEY.

United States Patent Office 3,064,640
Patented Nov. 20, 1962

3,064,640
EXTERNAL HEATING DEVICE
Ernest E. Donath, Pittsburgh, Pa., assignor to Koppers Company, Inc., a corporation of Delaware
Filed Jan. 13, 1961, Ser. No. 82,634
7 Claims. (Cl. 126—263)

The present invention relates to external heating devices and more particularly to the use of metal alkyls for controlled heat release in external heating devices.

With the present accent on exploration beyond the Antarctic Circle and military activity in the Arctic zone it is to be expected that there will be a like increase in interest in heating systems that have a high heat release per unit volume, can be used repetitively, are light in weight, self starting, operative under adverse weather conditions, noiseless, smokeless, not productive of noxious fumes, convenient in use and easily disposable after use. As an example of the uses to which such a heating system would be applied, one might consider the need for a rapid method of heating the quantities of water required in the preparation of food for troops or expeditions in such regions. Other uses are the heating of storage batteries and warmers for specific parts of the body.

In the past, external heating devices using alcohol, kerosene and various chemical compounds as fuels have been employed for warming the body extremities and certain arrangements such as Thermit bombs, cartridges of iron and sulfur, and cartridges containing barium chromate, aluminum and boron mixtures have been used for heating storage batteries. However, within reasonable weight limitations none of these appliances have sufficient controllable total heat release over an extended period of time to protect against sub-zero temperatures of the order of $-40°$ F. or to raise appreciably the temperature of a substance such as water which has a high specific heat.

It is therefore an object of the present invention to provide an external heating device having greatly augmented heat release per unit of volume and weight.

Another object of the present invention is to provide an external heating device capable of supplying a greater total heat release.

Still another object of the present invention is the conversion of a violently pyrophoric compound into a controllable heating medium.

A further object of the present invention is the provision of an external heating device with improved duration of heat release.

Still a further object of the present invention is the provision of an external heating device affording controlled repetitive use.

The present invention seeks to make available the high heat release upon oxidation of certain metal alkyls of violently pyrophoric nature. By using an adsorbent impregnated with metal alkyls it has been found that such metal alkyls may be safely oxidized in the presence of air providing high heat release over an extended time while susceptible to a high degree of control over the combustion process.

Other objects and advantages of the invention will hereinafter become more fully apparent from the following description of the annexed drawings, which illustrate a preferred embodiment and wherein:

FIG. 1 shows an elevational view, partly in section, showing the preferred embodiment of the present invention in operating position in a container of water and FIG. 2 is a cross-sectional view showing the arrangement of the metal alkyl-impregnated adsorbent and the control system for the admission of air.

Referring now to the drawings, wherein like reference characters designate like or corresponding parts throughout, there is shown in FIGS. 1 and 2 a typical five gallon container 11 for water into which has been inserted a specific embodiment of the heating device 12 of the present invention.

Heating device 12 is composed of an exterior shell 13 preferably of metal to provide a metal-to liquid heat transfer surface and a series of compartments 14 containing metal alkyl-impregnated carbon 16. Although metal alkyls have been considered dangerous and are susceptible to spontaneous ignition when in contact with water or air, it has been discovered that their activity is vastly reduced by the expedient of adsorbing the alkyls on specially activated carbon.

The metal alkyl-impregnated carbon for use in the present device is preferably prepared by heating activated carbon (BPL 4 x 10 mesh) to 300° C. under vacuum at a pressure of 1 mm. of Hg. During the heating period, this carbon is repeatedly purged by the addition of very dry, deoxygenated nitrogen. After cooling to room temperature, the prepared carbon is placed in a reaction tube and liquid metal alkyl is added thereto under an atmosphere of purified dry, deoxygenated nitrogen. Approximately one gram of liquid metal alkyl is added for each three grams of activated carbon, however, this ratio may vary between 0.1 and 0.5 gm. of metal alkyl per gm. of carbon with the optimum ratio being 0.3 to 0.45 weight of metal alkyl to weight of carbon matrix. The liquid metal alkyl may be caused to be adsorbed by the activated carbon either by agitating the tube or by warming tube and contents with an infra red lamp.

When the liquid metal alkyl has been adsorbed, the carbon so prepared remains a dry, free-flowing granular material which can be readily transferred to containers. Storage and transfer of the metal alkyl-impregnated carbon should be affected in a dry nitrogen atmosphere. Ordinary activated carbon of the type generally employed in gas masks may be used as a matrix for the metal alkyls, however, activated carbon prepared as indicated above is preferred.

Containers used for storing the metal alkyl-impregnated carbon should be insulated and air-tight. At any time, of course, in the proper nitrogen atmosphere the metal alkyl-impregnated carbon can be placed into compartments 14 in shell 13 which is then sealed against the entry of air.

Thus, prior to use, shell 13 contains unreacted particles of metal alkyl-impregnated carbon sealed in a nitrogen atmosphere, the particles 16 being arranged in the spaced, parallel compartments 14. Compartments 14 are each composed of two spaced parallel perforated sheets 17 of metal running from the top 18 of heating device 12 to perforated baffle 19 which is arranged a small distance from the bottom 20 to provide a plenum 21. Each exterior wall of shell 13 has a similar perforated sheet 17 spaced therefrom providing addtional compartments with particles 16 arranged therein.

When it is desired to obtain heat from the heating device 12 it is simply necessary to admit or force air into contact with the metal alkyl-impregnated carbon particles 16 either by hand pumping with a simple bulb and tube or, automatically, if desired. Being pyrophoric in nature, the temperature of the particles 16 rises markedly. Although there is no visible combustion and no visible film is formed upon particles 16 heat releases of 2.25 B.t.u./cc. of thermal compound to as much as 20 B.t.u./cc. of thermal compound have been realized. The carbon particles serve only as a carrying agent and are not consumed as a fuel during this reaction. Even at the lower value this gives an improvement factor of more than 100% over earlier methods.

Since (as is mentioned above) the adsorbing agent, a carbon matrix in the preferred embodiment, remains unconsumed, other adsorbing agents such as absolutely dry silica gel, porous oxides or silicates may also be employed.

To utilize heating device 12 with its automatic controls for the heating of water in container 11, it is simply necessary to remove the top (not shown) from container 11 and insert heating device 12 through opening 22 down into the water 23 until flange 24 engages top 25 around the rim of opening 22. Should it be necessary to counter the buoyant force of the water 23 against heating device 12, biasing means (not shown) can be provided to force flange 24 and seal 26 into engagement with top 25 as desired.

At this point, the shell is completely sealed against the entry of air by having valve 27 in air inlet line 28 turned to the closed position and by the use of a one-way check valve 29 in exhause line 31. When heating device 12 has been inserted as shown, air inlet line 28 can be coupled to supply line 32 leading from pressure tank 33. The air pressure in pressure tank 33 is maintained within specified limits by means of pressure sensitive switch 34 which makes or breaks the circuit between generator 36 and air pump 37.

Temperature-sensing bulb 38 is protected by perforated metal guard 39 and contains a pressure-generating fluid such as benzene (B.P. 80° C.), acetal (B.P. 102.2° C., or even water (B.P. 100° C.) depending upon the temperature range within which it is desired to operate. At low temperatures, that is at temperatures below the boiling point of the fluid in the temperature-sensing bulb 38, valve 41 remains in the open position away from valve seat 42. When in the closed position, valve 41 closes over opening 43 in septum 44 which divides valve housing 46 into inlet chamber 47 and supply chamber 48.

With the temperature of the water in container 11 at some reduced value such as 35° F., as an example, the operation of heating device 12 would be initiated simply by turning valve 27 to the open position permitting air to pass under pressure from pressure tank 33 through supply line 32 and air inlet line 28, into inlet chamber 47, through opening 43, into supply chamber 48, through supply tube 49 and into plenum 21. The air is then dispersed upwardly through perforated baffle 19 and through the perforated walls 17 of compartments 14 for passage through the metal alkyl-impregnated carbon particles 16.

As air passes into shell 13 through supply tube 49, nitrogen (which would normally be present in a previously unused heating device 12 as a result of filling compartments 14 with metal alkyl-impregnated carbon particles in an atmosphere of purified nitrogen) is forced out of shell 13 through one-way check valve 29 in exhaust line 31. As soon as the air is brought into contact with the metal alkyl-impregnated carbon particles 16 a definite temperature rise occurs although there is no visible combustion and no visible film is formed upon the carbon particles.

The air supply may be interrupted at any time by closing valve 27 and suitable heating for several hours can be obtained by the intermittent admission of air into shell 13. By supplying air continuously to the interior of shell 13 and by arranging to have the heat so generated be conducted outwardly through the metal surface of shell 13 to the water 23 in container 11, the temperature of this water is quickly raised the desired amount. This maximum temperature, of course, coincides with the boiling point of the pressure-generating fluid in temperature-sensing bulb 38 and when such a temperature has been reached, the pressure in bellows 52 will be greatly increased due to the very high vapor pressure of the pressure-generating fluid above its boiling point.

As the pressure in bellows 52 increases, bellows 52 expands in a vertical direction forcing lever arm 53 upwardly. The upward movement of lever arm 53 causes valve stem 54 which is pivotally attached to lever arm 53 to move upward. Should the upward movement of valve stem 54 be sufficient, valve 41 becomes seated on valve seat 42 thereby cutting off the passage of air from inlet chamber 47 to supply chamber 48. Pivot support 56 to which lever arm 53 is pivotally attached will, of course, be suitably spaced from the pivotal connection 57 of valve stem 54 to insure the application of a sufficiently large force to effect positive closure of valve 41 against the maximum pressure from the pressure tank 33. To partially offset the downward force acting upon valve 41 from the pressure of the air in pressure tank 33, an upward biasing force is supplied by spring 58. This spring may be tightened or loosened for adjustment by the use of knurled knob 59 which may be advanced or retracted on the threaded portion 61 on valve stem 54.

Although the device shown in FIGS. 1 and 2 is designed for automatic operation it may be readily seen that a hand bellows or aspirating bulb of rubber or plastic will serve equally well if coupled to air inlet line 28. The balance of the mechanism would also be employed with this type of operation since it would be undesirable to continue the application of air once the maximum desired temperature has been reached. Combustion gases formed during the controlled burning of the metal alkyls, escape from the interior of shell 13 by way of one-way check valve 29 in exhaust line 31. Since these combustion gases retain a certain amount of heat it may be desirable to conduct these gases through a heat transfer coil (not shown) external to shell 13 to transfer the balance of this heat to water 23 before exhausting the combustion gases to the atmosphere.

Experiments have shown that the most feasible of the metal alkyls is the group of triethylaluminum, trimethylaluminum, diethylaluminum hydride and triethylborane. The practicability of these metal alkyls has been demonstrated since it has been shown that these metal alkyls will operate satisfactorily at temperatures as low as −40° F., have the desirable high heat release per unit volume and weight, provide a higher total heat release than previous heating materials and the combustion thereof may be controlled to release heat over an extended period and to heat on a repetitive basis.

Reference to Table I gives an indication of the high heat release from oxidation of the various metal alkyls considered herein.

TABLE I

|  | Triethylborane (TEB) | Triethylaluminum (TEA) | Trimethylaluminum (TMA) | Diethylaluminum Hydride (DEAH) |
|---|---|---|---|---|
| Gross Heating value, B.t.u./lb | 21,700 | 19,500 | 19,050 | 19,600 |
| Net Heating Value, B.t.u./lb | 20,300 | 18,300 | 17,830 | 18,400 |
| Density | 0.688 | 0.835 | 0.75 | 0.80 |
| Pounds/gallon | 5.7 | 6.95 | 6.25 | 6.67 |
| B.t.u.'s/lb. Partial Combustion | 3,760 | 4,100 | 6,150 | 5,200 |
| B.t.u.'s/cc. Complete Combustion | 30 | 33 | 29 | 32 |
| B.t.u.'s/cc. Partial Combustion | 5.7 | 7.5 | 10.1 | 9.2 |

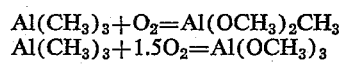

The following equations are illustrative of the combustion reaction:

$$Al(CH_3)_3 + O_2 = Al(OCH_3)_2CH_3$$
$$Al(CH_3)_3 + 1.5O_2 = Al(OCH_3)_3$$

It may be seen that varying degrees of completeness of the oxidation may result. To secure more complete oxidation catalysts such as cobalt, nickel, iron, copper, vanadium and others of the common oxidation catalysts may be added as finely divided particles in small quantities. Cobalt in particular has been shown to increase the degree of oxidation.

As an indication of the marked advance over certain methods previously used for heating batteries, a comparison of these methods is set forth in Table II.

TABLE II

[Total volume available for heating medium—100 cc.]

| | Total B.t.u.'s Released | Volume Used, cc. | B.t.u./cc. | Time of Heat Release |
|---|---|---|---|---|
| Iron and Sulfur Cartridge. | 100 | 85 | 1.18 | Less than 2 min. |
| BaCrO₄, Al and B | 41.4 | 45 | 0.92 | Do. |
| TEA on activated C (Partial Combustion). | 225 | 100 | 2.25 | Over 2 min.—repetitive. |
| TMA on activated C (Partial Combustion). | 303 | 100 | 3.03 | Do. |
| DEAH on activated C (Partial Combustion). | 276 | 100 | 2.76 | Do. |
| TEA on activated C (Complete Combustion). | over 1,000 | 50 | about 20 | Do. |
| TMA on activated C (Complete Combustion). | over 1,000 | 50 | about 20 | Do. |
| DEAH on activated C (Complete Combustion). | over 1,000 | 50 | about 20 | Do. |

Although it is intended that the prime utility of the present invention be for very low temperature applications, it may be employed in such everyday devices as defrosters for automobile windshields, hand warmers for hunters and various warmers for the body extremities.

Obviously many modifications and variations of the present invention are possible in the light of the above teachings. It is therefore to be understood, that within the scope of the appended claims, the invention may be practiced otherwise than as specifically described.

What is claimed:

1. An external heating device comprising a fluid-tight container having an inlet and an outlet thereto, said inlet being connected to a source of available oxygen, means in said outlet permitting the passage of fluid only in the outgoing direction, means in said inlet for interrupting the flow of oxygen to the interior of said container, a quantity of an inert adsorbent matrix selected from the group consisting of activated carbon, dry silica gel, porous oxides and porous silicates impregnated with a metal alkyl selected from the group consisting of triethylaluminum, trimethylaluminum, diethylaluminum hydride and triethylborane and arranged within said container and control means connected to said interrupting means for governing the amount of available oxygen entering said container for contact with said metal alkyl-impregnated matrix.

2. An external heating device substantially as recited in claim 1 wherein the inert adsorbent matrix is activated carbon 3. An external heating device substantially as recited in claim 1 wherein the control means includes a temperature-sensing device.

4. A pyrophoric preparation for use in an external heating device composed of an inert adsorbent matrix selected from the group consisting of activated carbon, dry silica gel, porous oxides and porous silicates having a normally violently pyrophoric liquid metal alkyl adsorbed thereon.

5. A pyrophoric preparation substantially as recited in claim 4 wherein the pyrophoric preparation is a dry, free-flowing particulate material.

6. A pyrophoric preparation substantially as recited in claim 4 wherein the inert adsorbent matrix is activated carbon.

7. A pyrophoric preparation for use in external heating devices composed of granules of an inert adsorbent matrix selected from the group consisting of activated carbon, dry silica gel, porous oxides and porous silicates having adsorbed thereon a quantity of liquid metal alkyl from the group consisting of triethylaluminum, trimethylaluminum, diethylaluminum hydride and triethylborane.

References Cited in the file of this patent

UNITED STATES PATENTS

| 1,910,874 | Ziegler | May 23, 1933 |
| 2,149,694 | Vollrath | Mar. 7, 1939 |

FOREIGN PATENTS

| 498,552 | France | Oct. 22, 1919 |